United States Patent
Horn et al.

(10) Patent No.: US 12,335,179 B2
(45) Date of Patent: Jun. 17, 2025

(54) SKIPPED PORTIONS OF SYNCHRONIZATION SIGNAL BLOCKS ASSOCIATED WITH BEAMS HAVING AN ESTABLISHED CONNECTION

(71) Applicant: QUALCOMM Incorporated, San Diego, CA (US)

(72) Inventors: Idan Michael Horn, Hod Hasharon (IL); Shay Landis, Hod Hasharon (IL); Yehonatan Dallal, Kfar Saba (IL)

(73) Assignee: QUALCOMM Incorporated, San Diego, CA (US)

( * ) Notice: Subject to any disclaimer, the term of this patent is extended or adjusted under 35 U.S.C. 154(b) by 465 days.

(21) Appl. No.: 17/811,839

(22) Filed: Jul. 11, 2022

(65) Prior Publication Data
US 2024/0014961 A1    Jan. 11, 2024

(51) Int. Cl.
*H04W 76/10* (2018.01)
*H04L 5/00* (2006.01)

(52) U.S. Cl.
CPC .......... *H04L 5/0048* (2013.01); *H04L 5/0078* (2013.01); *H04W 76/10* (2018.02)

(58) Field of Classification Search
CPC ..... H04L 5/0048; H04L 5/0078; H04W 76/10
USPC .......................................................... 370/329
See application file for complete search history.

(56) References Cited

U.S. PATENT DOCUMENTS

| 2021/0105739 A1* | 4/2021 | Lin | H04W 72/0446 |
| 2021/0235513 A1* | 7/2021 | Kim | H04W 56/001 |
| 2022/0150851 A1 | 5/2022 | Tian et al. | |

OTHER PUBLICATIONS

International Search Report and Written Opinion—PCT/US2023/068797—ISA/EPO—Sep. 22, 2023.

\* cited by examiner

*Primary Examiner* — Christopher R Crompton
(74) *Attorney, Agent, or Firm* — Harrity & Harrity

(57) ABSTRACT

Various aspects of the present disclosure generally relate to wireless communication. In some aspects, a user equipment (UE) may establish a connection with a network node using a beam. The UE may receive, based at least in part on establishing the connection using the beam, an indication that the network node will refrain from transmission of synchronization signal block (SSB) signaling during a portion of an SSB occasion associated with the beam. Numerous other aspects are described.

30 Claims, 11 Drawing Sheets

SKIPPED PORTIONS OF SYNCHRONIZATION SIGNAL BLOCKS ASSOCIATED WITH BEAMS HAVING AN ESTABLISHED CONNECTION

FIELD OF THE DISCLOSURE

Aspects of the present disclosure generally relate to wireless communication and to techniques and apparatuses for skipped portions of synchronization signal blocks (SSBs) associated with beams having an established connection.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

SUMMARY

Figure 1:
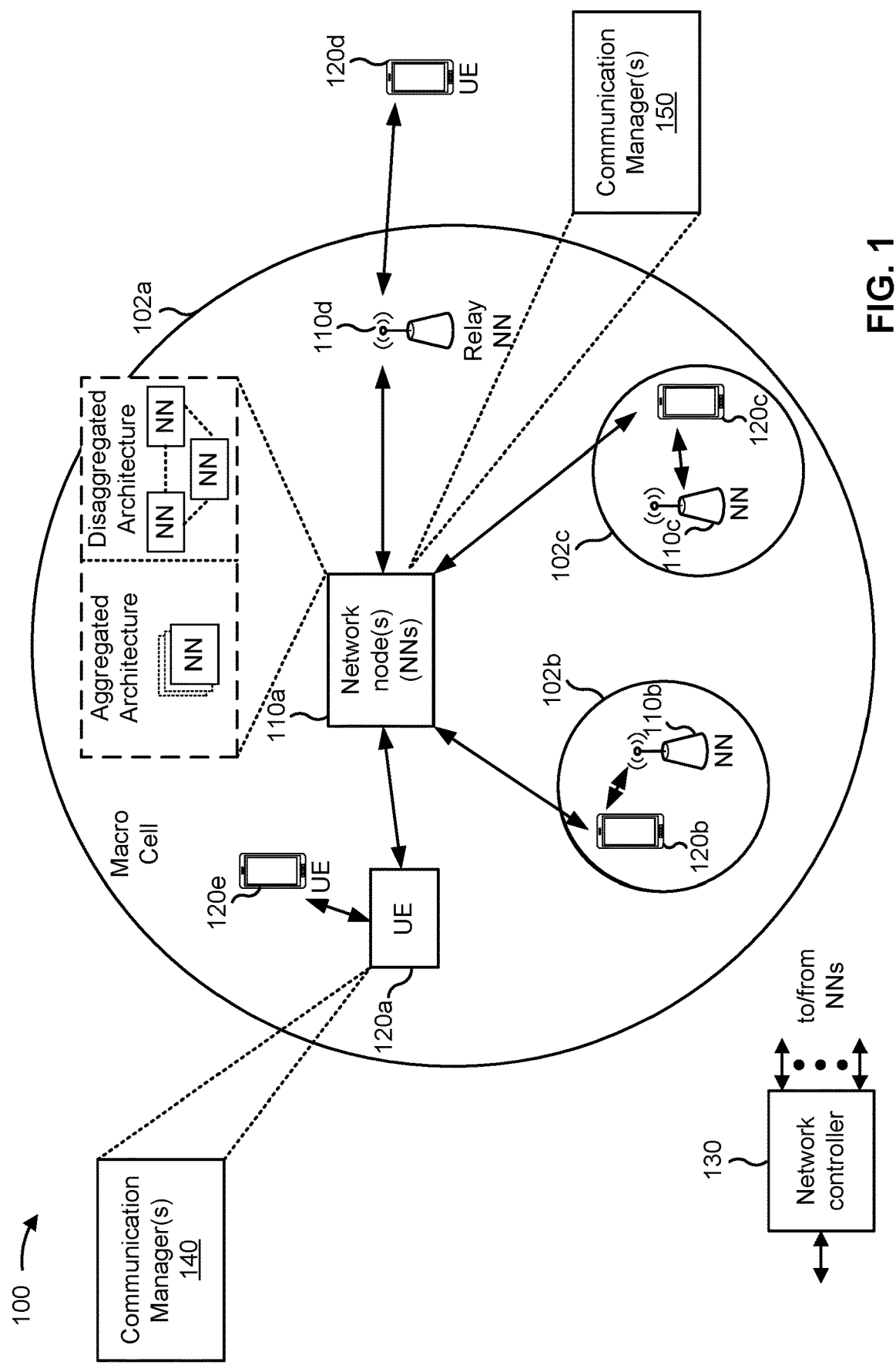
FIG. 1 is a diagram illustrating an example of a wireless network, in accordance with the present disclosure.

Some aspects described herein relate to a method of wireless communication performed by a user equipment (UE). The method may include establishing a connection with a network node using a beam. The method may include receiving, based at least in part on establishing the connection using the beam, an indication that the network node will refrain from transmission of synchronization signal block (SSB) signaling during a portion of an SSB occasion associated with the beam.

Some aspects described herein relate to a method of wireless communication performed by a network node. The method may include establishing a connection with a UE using a beam. The method may include transmitting, based at least in part on establishing the connection using the beam, an indication that the network node will refrain from transmission of SSB signaling during a portion of an SSB occasion associated with the beam.

Some aspects described herein relate to a UE for wireless communication. The user equipment may include a memory and one or more processors coupled to the memory. The one or more processors may be configured to establish a connection with a network node using a beam. The one or more processors may be configured to receive, based at least in part on establishing the connection using the beam, an indication that the network node will refrain from transmission of SSB signaling during a portion of an SSB occasion associated with the beam.

Some aspects described herein relate to a network node for wireless communication. The network node may include a memory and one or more processors coupled to the memory. The one or more processors may be configured to establish a connection with a UE using a beam. The one or more processors may be configured to transmit, based at least in part on establishing the connection using the beam, an indication that the network node will refrain from transmission of SSB signaling during a portion of an SSB occasion associated with the beam.

Some aspects described herein relate to a non-transitory computer-readable medium that stores a set of instructions for wireless communication by a UE. The set of instructions, when executed by one or more processors of the UE, may cause the UE to establish a connection with a network node using a beam. The set of instructions, when executed by one or more processors of the UE, may cause the UE to receive, based at least in part on establishing the connection using the beam, an indication that the network node will refrain from transmission of SSB signaling during a portion of an SSB occasion associated with the beam.

Some aspects described herein relate to a non-transitory computer-readable medium that stores a set of instructions for wireless communication by a network node. The set of instructions, when executed by one or more processors of the network node, may cause the network node to establish a connection with a UE using a beam. The set of instructions, when executed by one or more processors of the network node, may cause the network node to transmit, based at least in part on establishing the connection using the beam, an indication that the network node will refrain from transmission of SSB signaling during a portion of an SSB occasion associated with the beam.

Some aspects described herein relate to an apparatus for wireless communication. The apparatus may include means for establishing a connection with a network node using a beam. The apparatus may include means for receiving, based at least in part on establishing the connection using the beam, an indication that the network node will refrain from transmission of SSB signaling during a portion of an SSB occasion associated with the beam.

Some aspects described herein relate to an apparatus for wireless communication. The apparatus may include means for establishing a connection with a UE using a beam. The apparatus may include means for transmitting, based at least in part on establishing the connection using the beam, an indication that the network node will refrain from transmission of SSB signaling during a portion of an SSB occasion associated with the beam.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may establish a connection with a network node using a beam; and receive, based at least in part on establishing the connection using the beam, an indication that the network node will refrain from transmission of synchronization signal block (SSB) signaling during a portion of an SSB occasion associated with the beam. Additionally, or alternatively, the communication manager 140 may perform one or more other operations described herein.

In some aspects, the network node may include a communication manager 150. As described in more detail elsewhere herein, the communication manager 150 may establish a connection with a UE using a beam; and transmit, based at least in part on establishing the connection using the beam, an indication that the network node will refrain from transmission of SSB signaling during a portion of an SSB occasion associated with the beam. Additionally, or alternatively, the communication manager 150 may perform one or more other operations described herein.

As indicated above, FIG. 1 is provided as an example. Other examples may differ from what is described with regard to FIG. 1.

Figure 2:
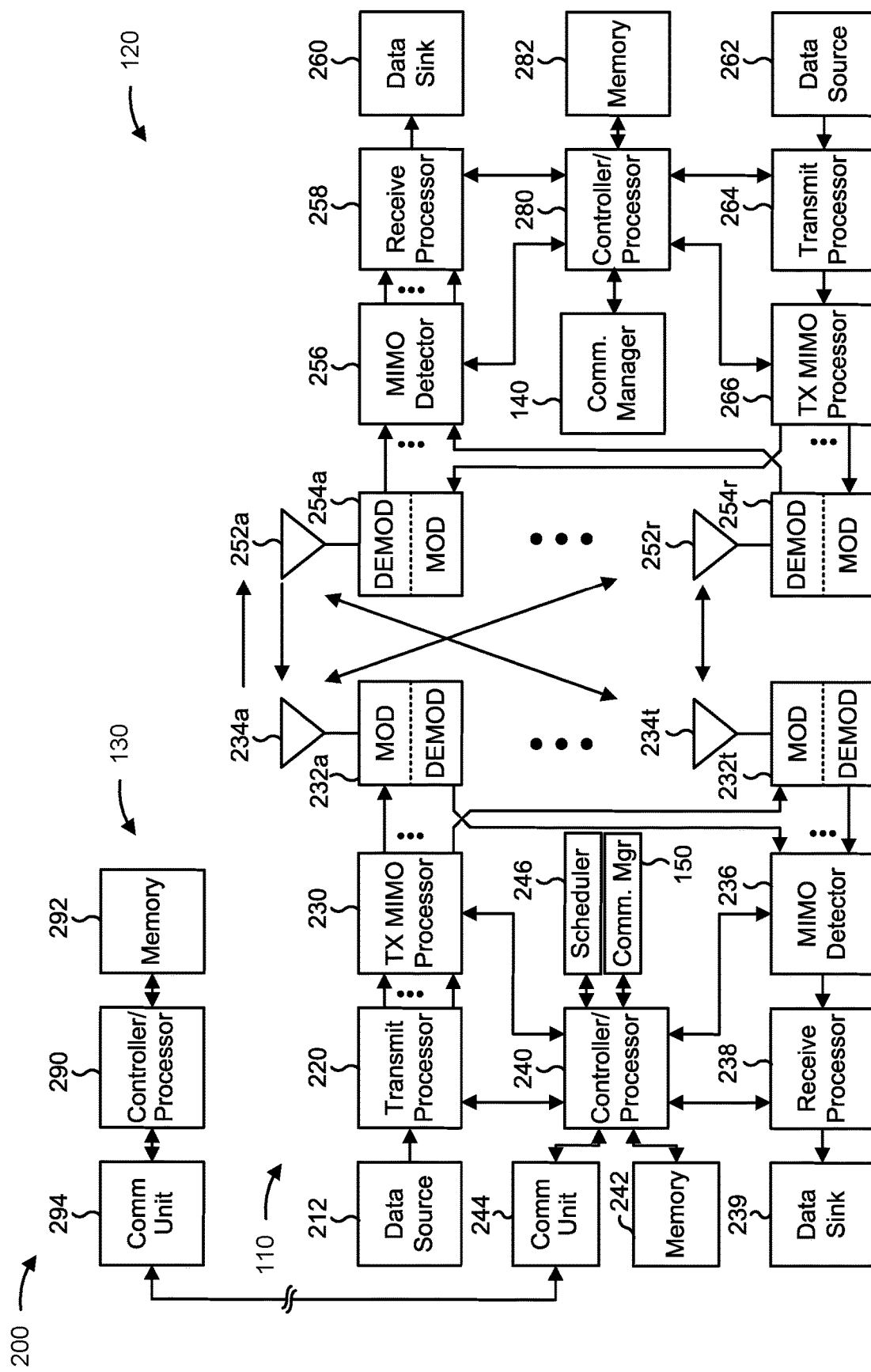
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242) to perform aspects of any of the methods described herein (e.g., with reference to FIGS. 6-11.

The controller/processor 240 of the network node 110, the controller/processor 280 of the UE 120, and/or any other component(s) of FIG. 2 may perform one or more techniques associated with skipped portions of SSBs associated with beams having an established connection, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE includes means for establishing a connection with a network node using a beam; and/or means for receiving, based at least in part on establishing the connection using the beam, an indication that the network node will refrain from transmission of SSB signaling during a portion of an SSB occasion associated with the beam. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node includes means for establishing a connection with a UE using a beam; and/or means for transmitting, based at least in part on establishing the connection using the beam, an indication that the network node will refrain from transmission of SSB signaling during a portion of an SSB occasion associated with the beam. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
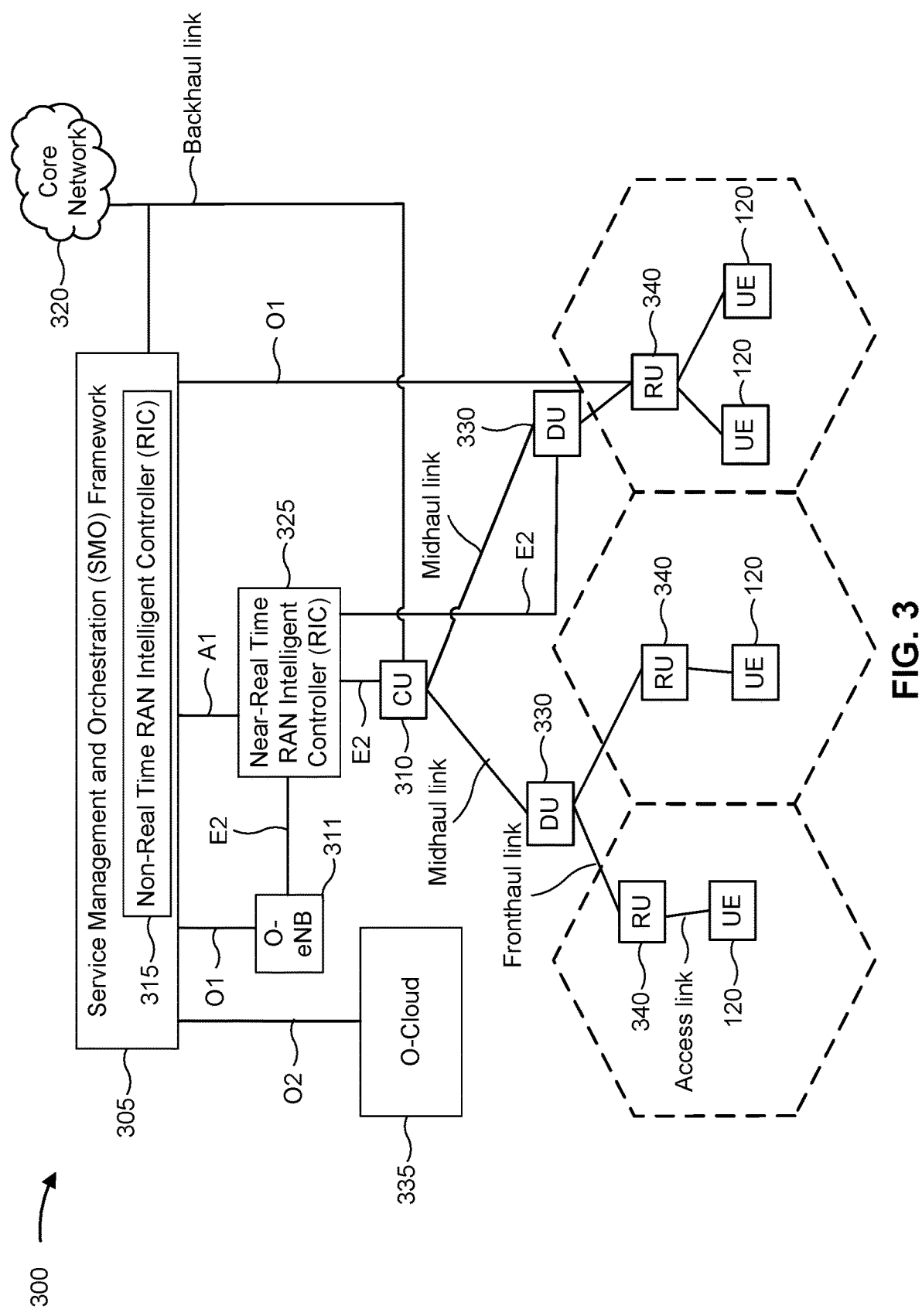
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 335) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT MC 315 or the Near-RT RIC 325 may be configured to tune RAN behavior or performance. For example, the Non-RT MC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
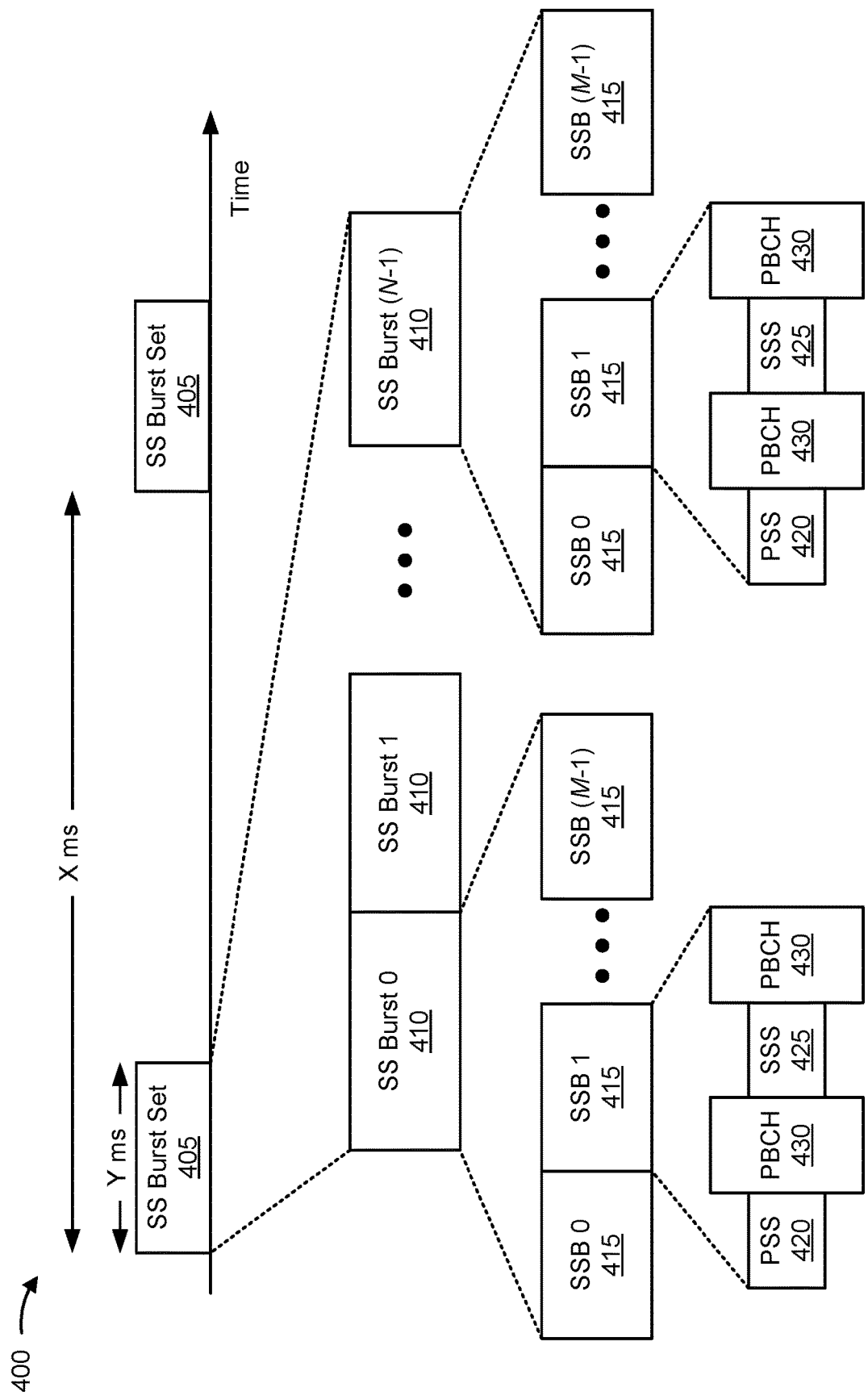
FIG. 4 is a diagram illustrating an example of a synchronization signal (SS) hierarchy, in accordance with the present disclosure.

FIG. 4 is a diagram illustrating an example 400 of a synchronization signal (SS) hierarchy, in accordance with the present disclosure. As shown in FIG. 4, the SS hierarchy may include an SS burst set 405, which may include multiple SS bursts 410, shown as SS burst 0 through SS burst N−1, where N is a maximum number of repetitions of the SS burst 410 that may be transmitted by one or more network nodes. As further shown, each SS burst 410 may include one or more SSBs 415, shown as SSB through SSB M−1, where M is a maximum number of SSBs 415 that can be carried by an SS burst 410. In some aspects, different SSBs 415 may be beam-formed differently (e.g., transmitted using different beams), and may be used for cell search, cell acquisition, beam management, and/or beam selection (e.g., as part of an initial network access procedure). An SS burst set 405 may be periodically transmitted by a wireless node (e.g., a network node 110), such as every X milliseconds, as shown in FIG. 4. In some aspects, an SS burst set 405 may have a fixed or dynamic length, shown as Y milliseconds in FIG. 4. In some cases, an SS burst set 405 or an SS burst 410 may be referred to as a discovery reference signal (DRS) transmission window or an SSB measurement time configuration (SMTC) window.

In some aspects, an SSB 415 may include resources that carry a PSS 420, an SSS 425, and/or a physical broadcast channel (PBCH) 430. In some aspects, multiple SSBs 415 are included in an SS burst 410 (e.g., with transmission on different beams), and the PSS 420, the SSS 425, and/or the PBCH 430 may be the same across each SSB 415 of the SS burst 410. In some aspects, a single SSB 415 may be included in an SS burst 410. In some aspects, the SSB 415 may be at least four symbols (e.g., OFDM symbols) in length, where each symbol carries one or more of the PSS 420 (e.g., occupying one symbol), the SSS 425 (e.g., occupying one symbol), and/or the PBCH 430 (e.g., occupying two symbols). In some aspects, an SSB 415 may be referred to as an SS/PBCH block.

In some aspects, the symbols of an SSB 415 are consecutive, as shown in FIG. 4. In some aspects, the symbols of an SSB 415 are non-consecutive. Similarly, in some aspects, one or more SSBs 415 of the SS burst 410 may be transmitted in consecutive radio resources (e.g., consecutive symbols) during one or more slots. Additionally, or alternatively, one or more SSBs 415 of the SS burst 410 may be transmitted in non-consecutive radio resources.

In some aspects, the SS bursts 410 may have a burst period, and the SSBs 415 of the SS burst 410 may be transmitted by a wireless node (e.g., a network node 110) according to the burst period. In this case, the SSBs 415 may be repeated during each SS burst 410. In some aspects, the SS burst set 405 may have a burst set periodicity, whereby the SS bursts 410 of the SS burst set 405 are transmitted by the wireless node according to the fixed burst set periodicity. In other words, the SS bursts 410 may be repeated during each SS burst set 405.

In some aspects, an SSB 415 may include an SSB index, which may correspond to a beam used to carry the SSB 415. A UE 120 may monitor for and/or measure SSBs 415 using different receive (Rx) beams during an initial network access procedure and/or a cell search procedure, among other examples. Based at least in part on the monitoring and/or measuring, the UE 120 may indicate one or more SSBs 415 with a best signal parameter (e.g., an RSRP parameter) to a network node 110 (e.g., directly or via one or more other network nodes). The network node 110 and the UE 120 may use the one or more indicated SSBs 415 to select one or more beams to be used for communication between the network node 110 and the UE 120 (e.g., for a random access channel (RACH) procedure). Additionally, or alternatively, the UE 120 may use the SSB 415 and/or the SSB index to determine a cell timing for a cell via which the SSB 415 is received (e.g., a serving cell).

As indicated above, FIG. 4 is provided as an example. Other examples may differ from what is described with regard to FIG. 4.

Figure 5:
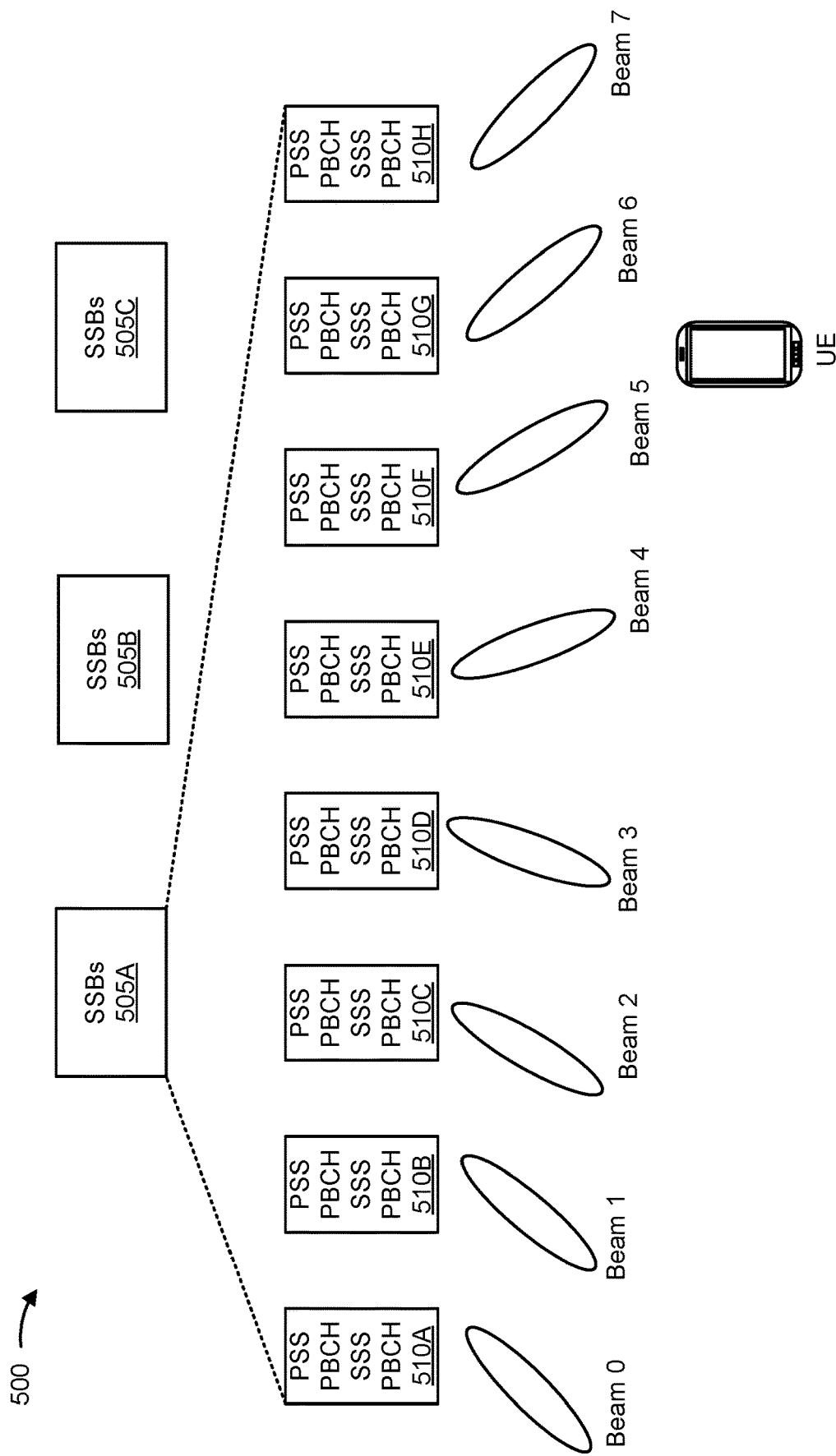
FIG. 5 is a diagram illustrating an example of a synchronization signal (SSB) burst including transmission of SSB signaling over multiple beams, in accordance with the present disclosure.

FIG. 5 is a diagram illustrating an example 500 of an SSB burst including transmission of SSB signaling over multiple beams, in accordance with the present disclosure. In context of FIG. 5, a network node (e.g., a CU, a DU, and/or an RU) may transmit SSBs within a cell associated with and/or provided by the network node.

As shown in FIG. 5, a set 505A of SSBs may include SSBs 510A-510H (shown as including PSS, PBCH, SSS, and PBCH in FIG. 5). In some networks, a number of SSBs (SSB signaling) within an SSB burst may include any number of SSBs, such as 8, 16, 32, 64, 128 (not limited to 2^n). Each of the SSBs may be associated with different beams. For example, the network node may transmit a first SSB 510A in a direction associated with beam 0, a second SSB 510B in a direction associated with beam 1, etc. The network node may transmit the SSBs via associated beams in a beam sweeping procedure in which the network node sequentially transmits the SSBs. In this way, the network node may sweep through and/or cover a cell range (e.g., and entire cell range in a spatial dimension). A number of SSBs transmitted on different half-slots during an SSB occasion may be confined to a predefined time window duration (e.g., a 5 millisecond (ms) window) and the number of SSBs form an SSB burst as described herein.

In some networks, the SSBs 505 may be periodic. For example, the network node may transmit the set 505A of SSBs at a first SSB occasion, transmit a set 505B of SSBs at a second SSB occasion, and a set 505C of SSBs at a third SSB occasion. In this way, a UE in the cell provided by the network node may periodically measure the SSBs and/or associated signal strengths over the beams used to transmit the SSBs.

As indicated above, FIG. 5 is provided as an example. Other examples may differ from what is described with regard to FIG. 5.

An SSB can be used by UEs within a cell coverage range for several purposes. For example, a UE may measure the SSB to discover the cell and to connect to the cell (e.g., an initial acquisition (Init Ack) procedure). Additionally, or alternatively, the UE may use the SSB to maintain a continuous time and frequency synchronization with a network (e.g., a network that includes the cell), a serving beam, and/or automatic gain control (AGC) tracking (e.g., in a connected mode). In some networks, the UE may use the SSB to maintain serving cell and neighboring cell measurements to support mobility and hand over procedures between cells.

In some networks (e.g., sub-terahertz networks), narrow beams are expected to be used to compensate for an increase in path loss and a decrease in power amplifier output power (e.g., due to increase in a carrier frequency of transmissions). For example, half power beam width of 2 degrees may be used to achieve 40 decibel gain (dBi) via directivity. The dBi may support a gain in throughputs and coverage of a cell. A Unified Rectangular Array (e.g., a rectangular configuration of antenna elements) implementation is expected to use similar beams with similar dBi.

Communications between a network node and a UE in the sub-terahertz bands is expected to function well for relatively short distances in comparison to communications using lower bands (e.g., FR1 or FR2). The combination of short link communication with very narrow beam results in a "beam per UE communication" with that each beam serving at most one UE. However, transmission of SSBs on a beam that already has a UE connected may consume power, network, communication, and processing resources unnecessarily because, for example, an additional UE is unlikely to be in a beam path of the beam based at least in part on the UE already being connected via the beam.

In some aspects described herein, a network node may puncture an SSB occasion by refraining to transmit SSB signaling during a portion of the SSB occasion associated with a beam on which a UE is already connected. In some aspects, the network node may increase throughputs based at least in part on diluting SSB transmission of a beam with a connected UE and instead transmitting other channels such as tracking reference signal (TRS), channel state information reference signals (CSI-RSs), and/or data signaling, such as a physical downlink shared channel (PDSCH), among other examples.

Based at least in part on refraining from transmitting the SSB signaling during a portion of the SSB occasion associated with a beam on which a UE is already connected, the network node may conserve power, network, communication, and processing resources that may have otherwise been used to transmit an SSB on a beam that already has a connected UE. Additionally, or alternatively, based at least in part on transmitting other signaling in place of the SSB signaling, the network node may increase throughput and reduce overhead. Additionally, or alternatively, the network node may transmit SSBs for only beams to which UEs are not connected, which may reduce a number of SSBs to transmit in an SSB burst. In networks with relatively high numbers of beams (e.g., a sub-terahertz network), transmission of SSBs for all beams during each SSB occasion may be prohibited by an available time window or may require a time window that reduces resources for transmission of data or other signaling.

In some aspects, the UE may transmit (e.g., at connection establishment) an indication that the UE supports punctured SSBs. The support may be based at least in part on, and the indication may indicate, a capability of maintaining (e.g., holding) tracking loops on non-SSB channels such as TRS, CSI-RS, and/or DMRSs on a PDSCH (e.g., the PDSCH DMRS replaces a periodicity of the SSB). The support may be based at least in part on, and the indication may indicate, a capability of estimating RSSI and/or RSRP on non-SSB channels (e.g., estimating with a threshold reliability based at least in part on multiple channels such as SSB and TRS, CSI-RS, and/or DMRS). The support may be based at least in part on, and the indication may indicate, a TRS and/or CSI-RS periodicity for supplementing or replacing SSB signaling (e.g., for maintaining tracking loops). In some aspects, the indication of support may be based at least in part on channel conditions and/or signal-to-interference-plus-noise ratio (SINR) of communications between the network node and the UE.

After establishing a connection, the network node may indicate to the UE that SSB puncturing is activated and that a serving beam associated with the UE will not transmit SSB signaling on the SSB burst. For example, the network node may indicate that the network node will not transmit the SSB signaling during one or more SSB occasions and/or may indicate that the network node will transmit SSBs with a decreased periodicity and/or duty cycle (diluted SSBs). When using diluted SSBs, the network node may indicate an SSB periodicity to the UE to indicate a periodicity of SSB occasions for which the network node will transmit SSB signaling over the serving beam.

The UE may maintain tracking loops based at least in part on one or more non-SSB channels, such as TRS, CSI-RS, and/or PDSCH DMRS. In some aspects, the UE may maintain tracking loops based at least in part on SSBs with reduced periodicity.

To improve estimators and according to channel conditions and/or SINR, the UE may trigger and/or request a resource (e.g., a channel) to replace the SSB signaling (e.g., the SSB channel and/or SSB periodicity). In some aspects, the resource used to replace the SSB signaling may have an allocation changed to optimize UE estimators and/or throughputs (e.g., based at least in part on a change in SINR).

If a handover procedure is desired, the network node may indicate that the SSB signaling on the serving beam is enabled before the handover is completed. In this way, the SSB signaling on the serving beam may resume to allow an additional UE to connect via the serving beam and/or for the UE to measure to determine if a handover back to the serving beam is desired.

The network node may indicate to the UE that one or more additional beams are not active and/or that the network node will refrain from transmitting SSBs via the one or more additional beams. For example, the network node may transmit indices of the one or more additional beams to avoid impairing and/or damaging a beam search or a cell search algorithm. In some aspects, the network node may transmit additional signaling to the UE during a portion of the SSB occasion associated with the one or more additional beams. In some aspects, the network node may skip the one or more additional beams.

In some aspects, the network node may transmit an indication of inactive SSBs on a cell associated with the network node and/or on one or more neighbor cells. The (in RRC messages or in medium access control (MAC) control element (CE)). In some aspects, the network node may transmit the indication of the inactive SSBs via RRC signaling, a MAC CE, and/or a system information block (SIB), among other examples. In some aspects, the network node may be configured with a threshold number of SSBs that may be inactive within the cell (e.g., per cell identification).

Figure 6:
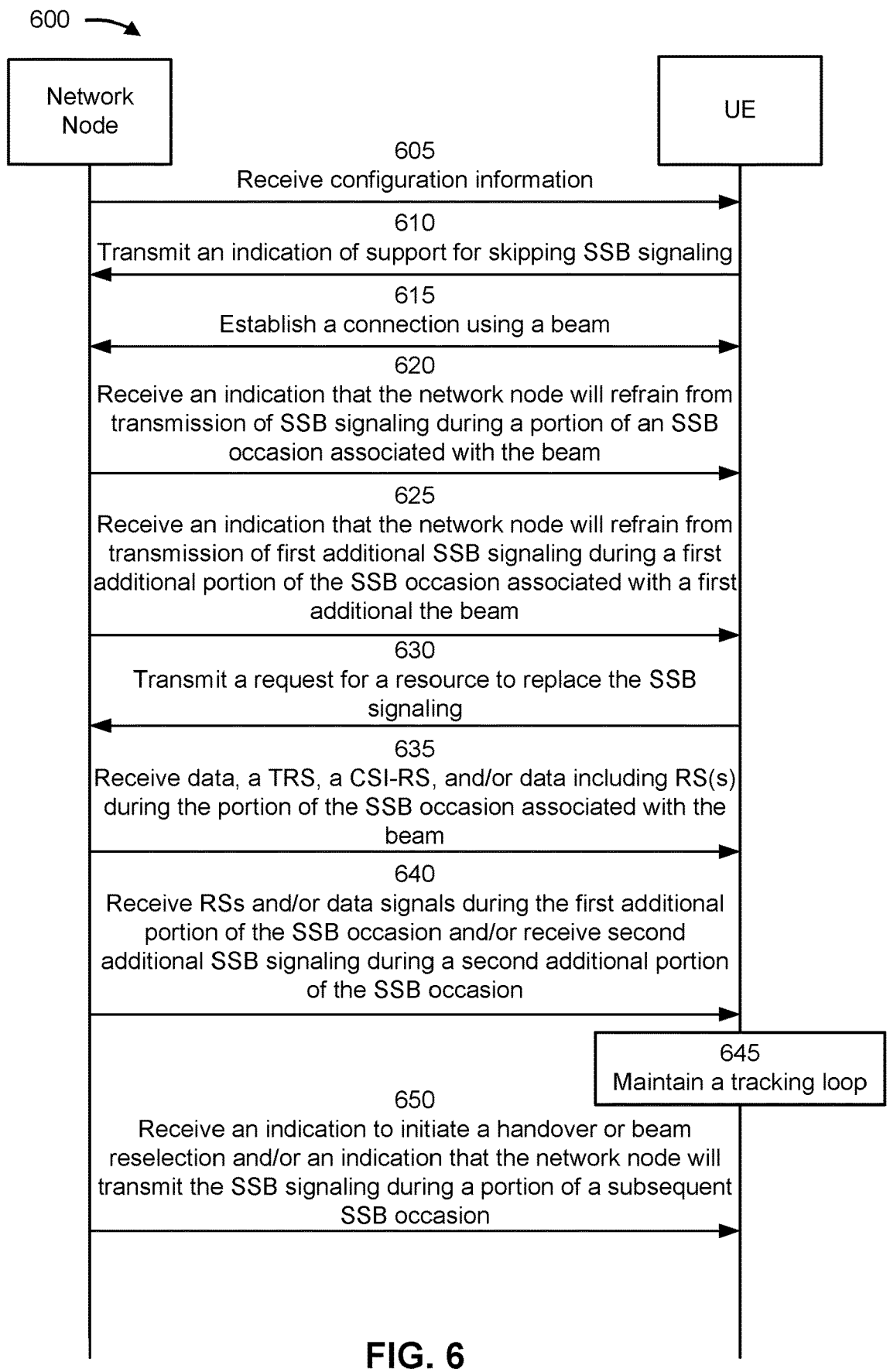
FIG. 6 is a diagram of an example associated with skipped portions of SSBs that are associated with beams having an established connection, in accordance with the present disclosure.

FIG. 6 is a diagram of an example 600 associated with skipped portions of SSBs that are associated with beams having an established connection, in accordance with the present disclosure. As shown in FIG. 6, a network node (e.g., network node 110, a CU, a DU, and/or an RU) may communicate with a UE (e.g., UE 120). In some aspects, the network node and the UE may be part of a wireless network (e.g., wireless network 100). The UE and the network node may have established a wireless connection prior to operations shown in FIG. 6.

As shown by reference number 605, the network node may transmit, and the UE may receive, configuration information. In some aspects, the UE may receive the configuration information via one or more of RRC signaling, one or more MAC CEs, and/or downlink control information (DCI), among other examples. In some aspects, the configuration information may include an indication of one or more configuration parameters (e.g., already known to the UE and/or previously indicated by the network node or other network device) for selection by the UE, and/or explicit configuration information for the UE to use to configure the UE, among other examples.

In some aspects, the configuration information may indicate that the UE is to transmit an indication of support for skipping SSB signaling during an SSB occasion. In some aspects, the configuration information may indicate that the UE is to receive an indication of a type of additional signaling in place of SSB signaling that is skipped during the SSB occasion. In some aspects, the configuration information may indicate that the UE is to transmit a request for a resource to replace the SSB (e.g., for maintaining a tracking loop).

The UE may configure itself based at least in part on the configuration information. In some aspects, the UE may be configured to perform one or more operations described herein based at least in part on the configuration information.

As shown by reference number 610, the UE may transmit, and the network node may receive, an indication of support for skipping SSB signaling (e.g., via a capabilities report). For example, the UE may transmit an indication of support for skipping SSB signaling associated with a beam through which the UE is already connected with the network node. In some aspects, the UE may transmit an indication of support for skipping SSB signaling associated with one or more additional beams to which the UE is not connected.

In some aspects, the indication of support for skipping SSB signaling may indicate whether the UE supports maintaining a tracking loop without SSB signaling, a type of resource needed for the UE to maintain a tracking loop without the SSB signaling (e.g., on non-SSB channels and/or resources), whether the UE supports reception of other signaling in place of the SSB signaling, and/or whether the UE supports reception of additional signaling in place of additional SSB signaling associated with a different beam (e.g., a non-serving beam for the UE). For example, the UE may transmit an indication that the UE supports transmitting an indication of a capability to maintain a tracking loop on non-SSB channels, transmitting an indication of a capability to estimate signal strength on non-SSB channels, and/or transmitting an indication of a requested periodicity of non-SSB reference signals for maintaining the tracking loop, among other examples.

As shown by reference number 615, the UE and the network node may establish a connection using a beam (a network node beam). For example, the UE and network node may establish the connection using the beam after a beam management procedure and/or a random access procedure, among other examples. In some aspects, the beam may support only a single UE. In some aspects, the beam may be associated with a relatively high carrier frequency (e.g., a sub-terahertz frequency).

As shown by reference number 620, the UE may receive, and the network node may transmit, an indication that the network node will refrain from transmission of SSB signaling during a portion of an SSB occasion associated with the beam. In some aspects, the network node may transmit the indication based at least in part on establishing the connection using the beam. The SSB occasion may include multiple portions with SSB signaling associated with different beams available for communicating with the network node.

In some aspects, the indication that the network node will refrain from transmission of SSB signaling includes an indication of a periodicity of SSB occasions configured to carry the SSB signaling during the portion associated with the beam. For example, the indication may include an indication that a pattern of SSB occasions will include the SSB signaling associated with the beam and an opposite pattern of SSB occasions will not include the SSB signaling associated with the beam.

As shown by reference number 625, the UE may receive, and the network node may transmit, an indication that the network node will refrain from transmission of first additional SSB signaling during a first additional portion of the SSB occasion associated with a first additional the beam. In some aspects, the network node may transmit the indication as part of an indication of inactive SSBs and/or inactive beams. The indication of inactive SSBs and/or inactive beams may be associated with a serving cell associated with the network node and/or for a neighbor cell. In some aspects, the indication of inactive SSBs and/or inactive beams may be associated with a threshold number of inactive SSBs and/or inactive beams. For example, the indication of inactive SSBs and/or inactive beams may have a maximum number of indicated inactive SSBs or beams.

In some aspects, the UE may use the indication to refrain from attempting to receive the first additional SSB signaling during the first additional portion of the SSB occasion. Additionally, or alternatively, the UE may determine an order of transmitted SSBs based at least in part on the indication that the network node will refrain from transmission of the first additional SSB signaling during the first additional portion of the SSB occasion. In some aspects, the network node may indicate that the network node will skip the first additional SSB signaling and/or transmit a different SSB signaling (e.g., associated with a different beam) in place of the first additional SSB signaling. Alternatively, the network node may indicate that the network node will transmit signaling to the UE, such as data and/or reference signals during the portion of the SSB occasion associated with the skipped SSB signaling.

As shown by reference number 630, the UE may transmit, and the network node may receive, a request for a resource to replace the SSB signaling. In some aspects, the UE may indicate one or more options of resources that the UE can use to replace the SSB signaling for maintaining the connection with the network node. For example, the UE may indicate that the UE may maintain a tracking loop with the network node based at least in part on receiving resources for tracking (e.g., TRSs, CSI-RSs, and/or DMRSs within data, among other examples).

As shown by reference number 635, the UE may receive, and the network node may transmit, data, a TRS, a CSI-RS, and/or data including one or more RSs (e.g., DMRSs) during the portion of the SSB occasion associated with the beam.

As shown by reference number 640, the UE may receive RSs and/or data signals during the first additional portion of the SSB occasion and/or receive second additional SSB signaling during a second additional portion of the SSB occasion. For example, the UE may receive data with DMRSs and/or other RSs, CSI-RSs, and/or TRSs during the second additional portion of the SSB occasion based at least in part on the network node skipping transmission of the additional SSB signaling associated with a non-serving beam. In this way, the network node and the UE may conserve resources that may have otherwise been used to carry the data with DMRSs and/or other RSs, CSI-RSs, and/or TRSs, among other examples.

In some aspects, the UE may receive additional SSB signaling during the second additional portion of the SSB occasion as part of beam management and/or to determine if beam reselection is appropriate. For example, the UE may measure signal strengths from one or more additional portions of the SSB occasion to determine if non-serving beams have higher signal strength than a serving beam.

As shown by reference number 645, the UE may maintain a tracking loop. The tracking loop may be associated with maintaining synchronization with the network node. In some aspects, the UE may maintain the tracking loop (e.g., one or more tracking loops) based at least in part on SSB signaling received in additional SSB occasions (e.g., in the portion associated with the beam) and/or non-SSB reference signals (e.g., CSI-RSs, DMRSs of a PDSCH, and/or TRSs, among other examples).

As shown by reference number 650, the UE may receive, and the network node may transmit, an indication to initiate a handover or beam reselection and/or an indication that the network node will transmit the SSB signaling during a portion of a subsequent SSB occasion. In this way, the beam may be available for an additional UE to measure and/or connect with the network node. Additionally, or alternatively, the beam many be available for the UE to measure to determine if a cell reselection back to the beam is appropriate (e.g., based at least in part on a measured signal strength of an SSB via the beam).

Based at least in part on refraining from transmitting the SSB signaling during a portion of the SSB occasion associated with a beam on which a UE is already connected, the network node may conserve power, network, communication, and processing resources that may have otherwise been used to transmit an SSB on a beam that already has a connected UE. Additionally, or alternatively, based at least in part on transmitting other signaling in place of the SSB signaling, the network node may increase throughput and reduce overhead. Additionally, or alternatively, the network node may transmit SSBs for only beams to which UEs are not connected, which may reduce a number of SSBs to transmit in an SSB burst. In networks with relatively high numbers of beams (e.g., a sub-terahertz network), transmission of SSBs for all beams during each SSB occasion may be prohibited by an available time window or may require a time window that reduces resources for transmission of data or other signaling.

As indicated above, FIG. 6 is provided as an example. Other examples may differ from what is described with respect to FIG. 6.

Figure 7:
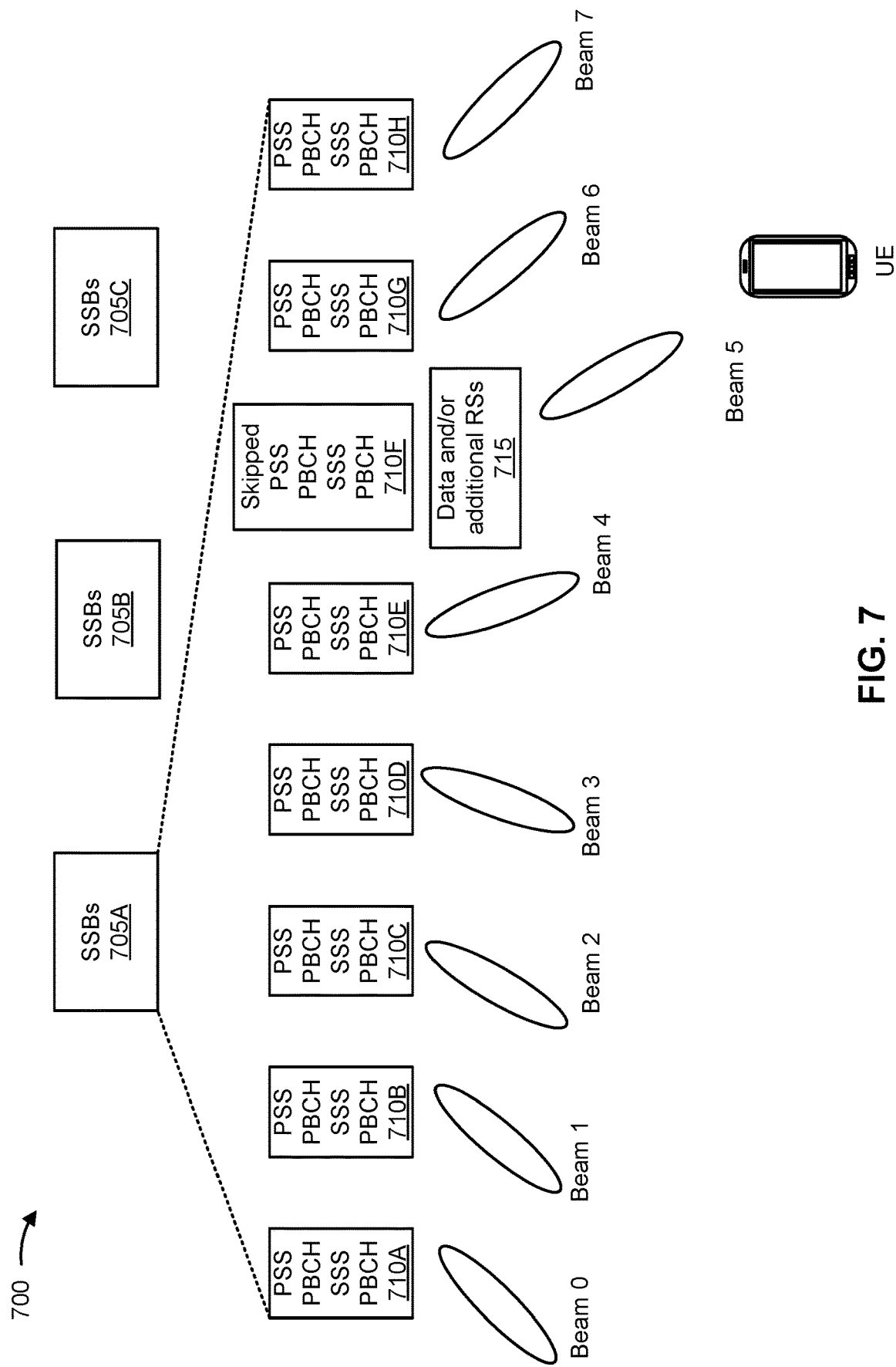
FIG. 7 is a diagram illustrating an example of an SSB burst including transmission of SSB signaling over multiple beams, in accordance with the present disclosure.

FIG. 7 is a diagram illustrating an example 700 of an SSB burst including transmission of SSB signaling over multiple beams, in accordance with the present disclosure. In context of FIG. 7, a network node (e.g., a CU, a DU, and/or an RU) may transmit SSBs within a cell associated with and/or provided by the network node.

As shown in FIG. 7, a set 705A of SSBs may include SSBs 710A-710H (shown as including PSS, PBCH, SSS, and PBCH in FIG. 7). In some networks, a number of SSBs (SSB signaling) within an SSB burst may include any number of SSBs, such as 8, 16, 32, 64, 128 (not limited to $2^n$). Each of the SSBs may be associated with different beams. For example, the network node may transmit a first SSB 710A in a direction associated with beam 0, a second SSB 710B in a direction associated with beam 1, etc. The network node may transmit the SSBs via associated beams in a beam sweeping procedure in which the network node sequentially transmits the SSBs. In this way, the network node may sweep through and/or cover a cell range (e.g., and entire cell range in a spatial dimension). A number of SSBs transmitted on different half-slots during an SSB occasion may be confined to a predefined time window duration (e.g., a 5 millisecond (ms) window) and the number of SSBs form an SSB burst as described herein.

In some networks, the sets 705 may be periodic. For example, the network node may transmit the set 705A of SSBs at a first SSB occasion, transmit a set 705B of SSBs at a second SSB occasion, and a set 705C of SSBs at a third SSB occasion. In this way, a UE in the cell provided by the network node may periodically measure the SSBs and/or associated signal strengths over the beams used to transmit the SSBs.

As shown in FIG. 7, the SSB 710F may be associated with beam 5 through which the UE has already established a connection. In the set 705A of SSBs, the network node may skip the SSB 710F and/or replace the SSB 710F with data and/or additional RSs 715. For example, the network node may replace the SSB 710F with data having DMRSs, CSI-RSs, and/or TRSs that may be used to synchronize with the network node and/or maintain a tracking loop for subsequent communications.

In some aspects, the set 705B and/or the set 705C may also skip the SSB 710F based at least in part on the UE supporting maintaining the tracking loop without the SSB 710F (e.g., via a replacement resource and/or based at least in part on RSs within the data and/or additional RSs 715). Alternatively, the network node may transmit the SSB 710F with a reduced periodicity (e.g., skipping the SSB 710F in one or more of the sets 705 of SSBs and transmitting the SSB 710F in one or more additional sets 705 of SSBs). As indicated above, FIG. 7 is provided as an example. Other examples may differ from what is described with regard to FIG. 7.

Figure 8:
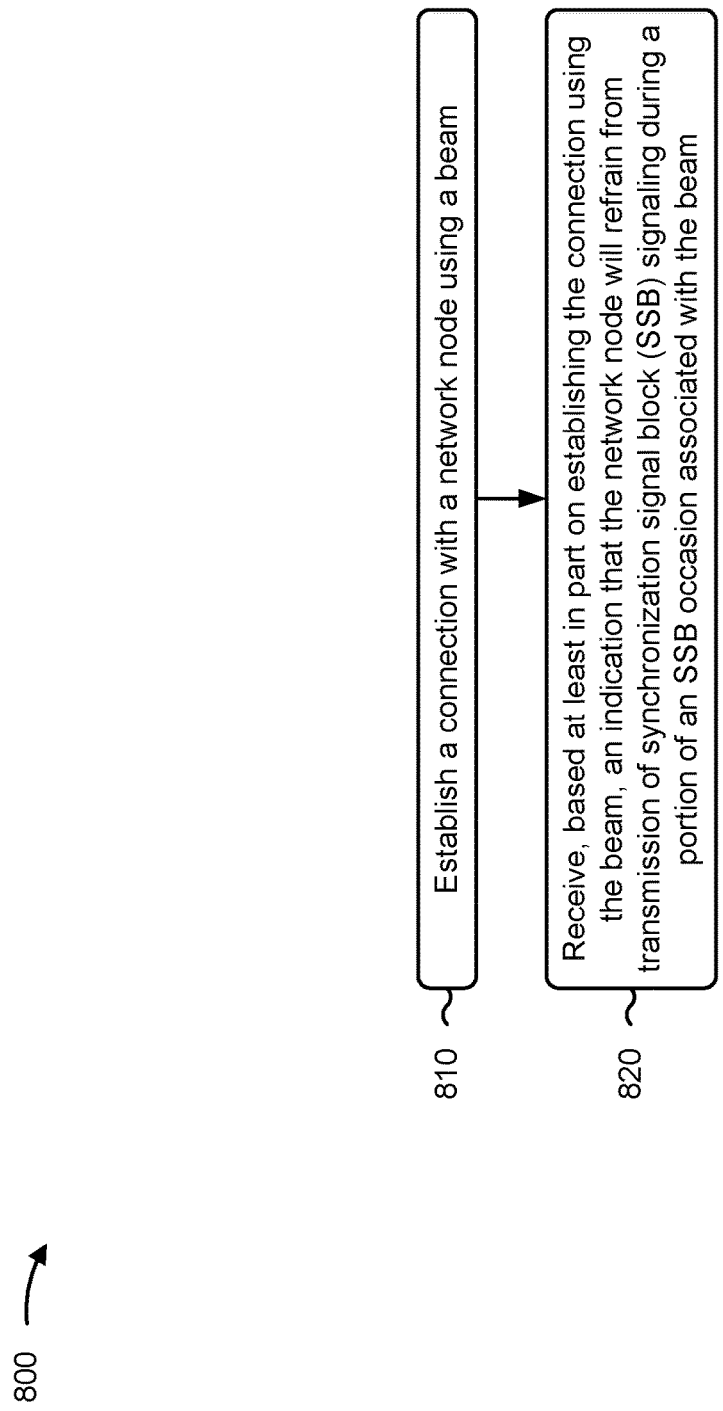
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., UE 120) performs operations associated with skipped portions of SSBs associated with beams having an established connection.

As shown in FIG. 8, in some aspects, process 800 may include establishing a connection with a network node using a beam (block 810). For example, the UE (e.g., using communication manager 140 and/or communication manager 1008, depicted in FIG. 10) may establish a connection with a network node using a beam, as described above.

As further shown in FIG. 8, in some aspects, process 800 may include receiving, based at least in part on establishing the connection using the beam, an indication that the network node will refrain from transmission of SSB signaling during a portion of an SSB occasion associated with the beam (block 820). For example, the UE (e.g., using communication manager 140 and/or reception component 1002, depicted in FIG. 10) may receive, based at least in part on establishing the connection using the beam, an indication that the network node will refrain from transmission of SSB signaling during a portion of an SSB occasion associated with the beam, as described above.

Process 800 may include additional aspects, such as any single aspect or any combination of aspects described below and/or in connection with one or more other processes described elsewhere herein.

In a first aspect, process 800 includes transmitting an indication that the UE supports skipping the SSB signaling during the portion of the SSB occasion associated with the beam.

In a second aspect, alone or in combination with the first aspect, transmission of the indication that the UE supports skipping the SSB signaling comprises one or more of transmitting an indication of a capability to maintain a tracking loop on non-SSB channels, transmitting an indication of a capability to estimate signal strength on non-SSB channels, or transmitting an indication of a requested periodicity of non-SSB reference signals for maintaining the tracking loop.

In a third aspect, alone or in combination with one or more of the first and second aspects, the indication that the network node will refrain from transmission of SSB signaling during the portion of the SSB occasion associated with the beam comprises an indication of a periodicity of SSB occasions configured to carry the SSB signaling during the portion associated with the beam.

In a fourth aspect, alone or in combination with one or more of the first through third aspects, the beam supports a single UE connection.

In a fifth aspect, alone or in combination with one or more of the first through fourth aspects, process 800 includes maintaining a tracking loop based at least in part on one or more of SSB signaling received in additional SSB occasions, or non-SSB reference signals.

In a sixth aspect, alone or in combination with one or more of the first through fifth aspects, process 800 includes receiving one or more of additional SSB signaling during an additional portion of the SSB occasion associated with an additional beam, data during the portion of the SSB occasion associated with the beam, a tracking reference signal during the portion of the SSB occasion associated with the beam, a CSI-RS during the portion of the SSB occasion associated with the beam, or data including one or more reference signals during the portion of the SSB occasion associated with the beam.

In a seventh aspect, alone or in combination with one or more of the first through sixth aspects, process 800 includes transmitting a request for a resource to replace the SSB signaling.

In an eighth aspect, alone or in combination with one or more of the first through seventh aspects, process 800 includes receiving an indication to initiate a handover or a beam reselection, and receiving an indication that the network node will transmit the SSB signaling during a portion of a subsequent SSB occasion associated with the beam.

In a ninth aspect, alone or in combination with one or more of the first through eighth aspects, process 800 includes receiving an indication that the network node will refrain from transmission of additional SSB signaling during one or more additional portions of the SSB occasion associated with one or more additional beams.

In a tenth aspect, alone or in combination with one or more of the first through ninth aspects, reception of the indication that the network node will refrain from transmission of the additional SSB signaling during the one or more additional portions of the SSB occasion associated with the one or more additional beams comprises one or more of receiving an indication of inactive SSBs on a serving cell of the network node, or receiving an indication of inactive SSBs on a neighbor cell of the serving cell.

In an eleventh aspect, alone or in combination with one or more of the first through tenth aspects, the indication of SSBs on the serving cell or the indication of SSBs on the neighbor cell includes a number of inactive SSBs, and wherein the number of inactive SSBs satisfies a threshold.

In a twelfth aspect, alone or in combination with one or more of the first through eleventh aspects, process 800 includes receiving, during the one or more additional portions of the SSB occasion, one or more of referencing signals, or data signals.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
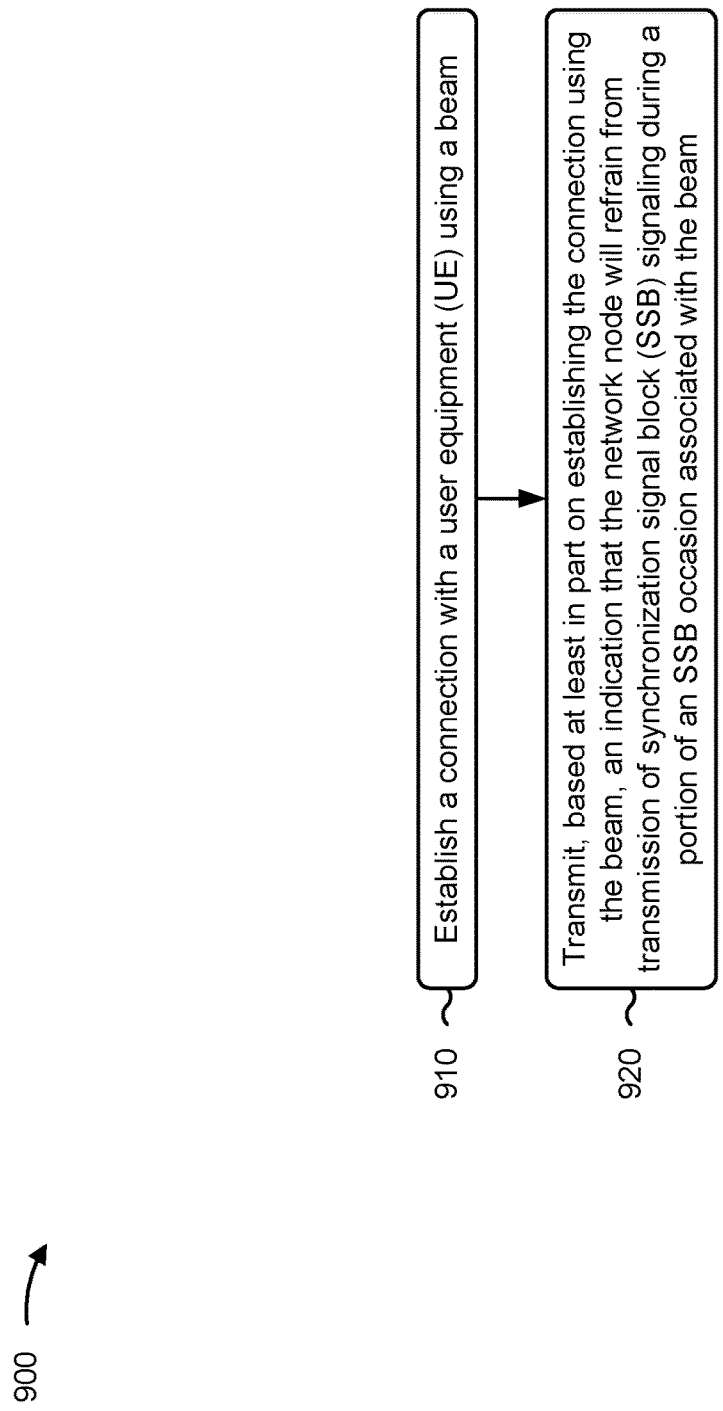
FIG. 9 is a diagram illustrating an example process performed, for example, by a network node, in accordance with the present disclosure.

FIG. 9 is a diagram illustrating an example process 900 performed, for example, by a network node, in accordance with the present disclosure. Example process 900 is an example where the network node (e.g., network node 110) performs operations associated with skipped portions of SSBs associated with beams having an established connection.

As shown in FIG. 9, in some aspects, process 900 may include establishing a connection with a UE using a beam (block 910). For example, the network node (e.g., using communication manager 150 and/or communication manager 1108, depicted in FIG. 11) may establish a connection with a UE using a beam, as described above.

As further shown in FIG. 9, in some aspects, process 900 may include transmitting, based at least in part on establishing the connection using the beam, an indication that the network node will refrain from transmission of SSB signaling during a portion of an SSB occasion associated with the beam (block 920). For example, the network node (e.g., using communication manager 150 and/or transmission component 1104, depicted in FIG. 11) may transmit, based at least in part on establishing the connection using the beam, an indication that the network node will refrain from transmission of SSB signaling during a portion of an SSB occasion associated with the beam, as described above.

Process 900 may include additional aspects, such as any single aspect or any combination of aspects described below and/or in connection with one or more other processes described elsewhere herein.

In a first aspect, process 900 includes receiving an indication that the UE supports skipping the SSB signaling during the portion of the SSB occasion associated with the beam.

In a second aspect, alone or in combination with the first aspect, reception of the indication that the UE supports skipping the SSB signaling comprises one or more of receiving an indication of a capability to maintain a tracking loop on non-SSB channels, receiving an indication of a capability to estimate signal strength on non-SSB channels, or receiving an indication of a requested periodicity of non-SSB reference signals for maintaining the tracking loop.

In a third aspect, alone or in combination with one or more of the first and second aspects, the indication that the network node will refrain from transmission of SSB signaling during the portion of the SSB occasion associated with the beam comprises an indication of a periodicity of SSB occasions configured to carry the SSB signaling during the portion associated with the beam.

In a fourth aspect, alone or in combination with one or more of the first through third aspects, the beam supports a single UE connection.

In a fifth aspect, alone or in combination with one or more of the first through fourth aspects, process 900 includes transmitting one or more of additional SSB signaling during an additional portion of the SSB occasion associated with an additional beam, data during the portion of the SSB occasion associated with the beam, a tracking reference signal during the portion of the SSB occasion associated with the beam, a CSI-RS during the portion of the SSB occasion associated with the beam, or data including one or more reference signals during the portion of the SSB occasion associated with the beam.

In a sixth aspect, alone or in combination with one or more of the first through fifth aspects, process 900 includes receiving a request for a resource to replace the SSB signaling.

In a seventh aspect, alone or in combination with one or more of the first through sixth aspects, process 900 includes transmitting an indication to initiate a handover or a beam reselection, and transmitting an indication that the network node will transmit the SSB signaling during a portion of a subsequent SSB occasion associated with the beam.

In an eighth aspect, alone or in combination with one or more of the first through seventh aspects, process 900 includes transmitting an indication that the network node will refrain from transmission of additional SSB signaling during one or more additional portions of the SSB occasion associated with one or more additional beams.

In a ninth aspect, alone or in combination with one or more of the first through eighth aspects, transmission of the indication that the network node will refrain from transmission of the additional SSB signaling during the one or more additional portions of the SSB occasion associated with the one or more additional beams comprises one or more of transmitting an indication of inactive SSBs on a serving cell of the network node, or transmitting an indication of inactive SSBs on a neighbor cell of the serving cell.

In a tenth aspect, alone or in combination with one or more of the first through ninth aspects, the indication of SSBs on the serving cell or the indication of SSBs on the neighbor cell includes a number of inactive SSBs, and wherein the number of inactive SSBs satisfies a threshold.

In an eleventh aspect, alone or in combination with one or more of the first through tenth aspects, process 900 includes transmitting, during the one or more additional portions of the SSB occasion, one or more of referencing signals, or data signals.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
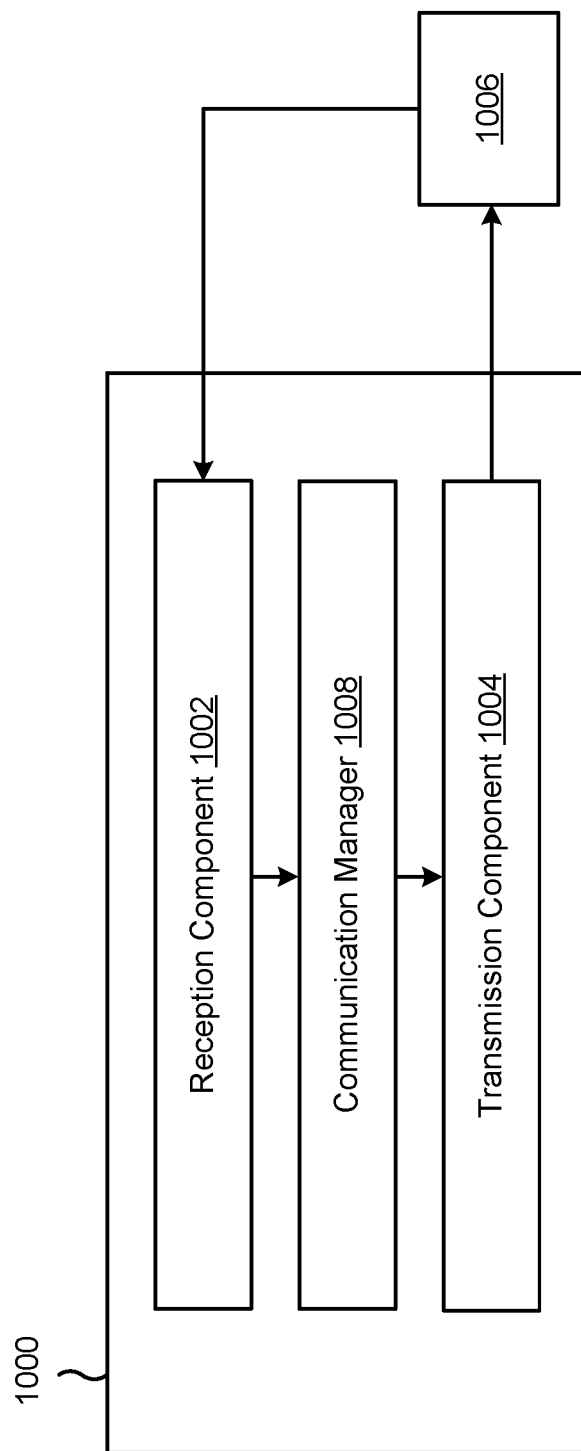
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a communication manager 1008 (e.g., the communication manager 140).

In some aspects, the apparatus 1000 may be configured to perform one or more operations described herein in connection with FIGS. 6-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The communication manager 1008 may establish a connection with a network node using a beam. The reception component 1002 may receive, based at least in part on establishing the connection using the beam, an indication that the network node will refrain from transmission of SSB signaling during a portion of an SSB occasion associated with the beam.

The transmission component 1004 may transmit an indication that the UE supports skipping the SSB signaling during the portion of the SSB occasion associated with the beam.

The communication manager 1008 may maintain a tracking loop based at least in part on one or more of SSB signaling received in additional SSB occasions, or non-SSB reference signals.

The reception component 1002 may receive one or more of additional SSB signaling during an additional portion of the SSB occasion associated with an additional beam, data during the portion of the SSB occasion associated with the beam, a tracking reference signal during the portion of the SSB occasion associated with the beam, a CSI-RS during the portion of the SSB occasion associated with the beam, or data including one or more reference signals during the portion of the SSB occasion associated with the beam.

The transmission component 1004 may transmit a request for a resource to replace the SSB signaling.

The reception component 1002 may receive an indication to initiate a handover or a beam reselection.

The reception component 1002 may receive an indication that the network node will transmit the SSB signaling during a portion of a subsequent SSB occasion associated with the beam.

The reception component 1002 may receive an indication that the network node will refrain from transmission of additional SSB signaling during one or more additional portions of the SSB occasion associated with one or more additional beams.

The reception component 1002 may receive, during the one or more additional portions of the SSB occasion, one or more of reference signals, or data signals.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
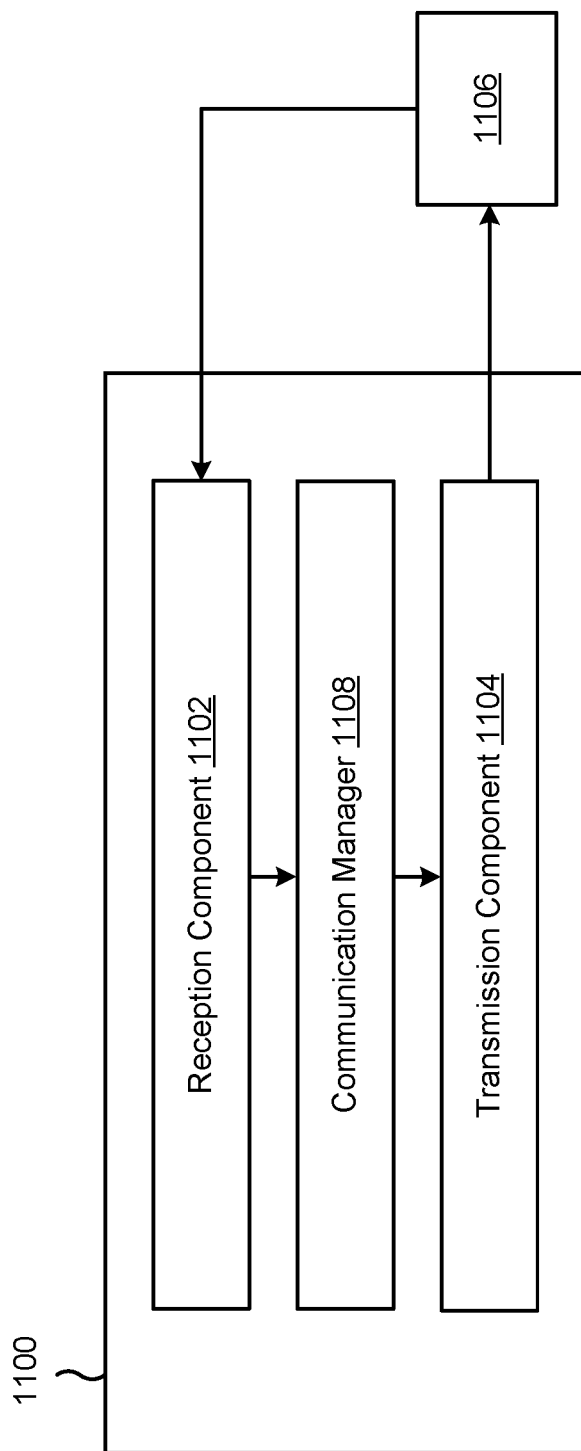
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a network node, or a network node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a communication manager 1108 (e.g., the communication manager 150).

In some aspects, the apparatus 1100 may be configured to perform one or more operations described herein in connection with FIGS. 6-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network node described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the network node described in connection with FIG. 2. In some aspects, the transmission component 1104 may be co-located with the reception component 1102 in a transceiver.

The communication manager 1108 may establish a connection with a UE using a beam. The transmission component 1104 may transmit, based at least in part on establishing the connection using the beam, an indication that the network node will refrain from transmission of SSB signaling during a portion of an SSB occasion associated with the beam.

The reception component 1102 may receive an indication that the UE supports skipping the SSB signaling during the portion of the SSB occasion associated with the beam.

The transmission component 1104 may transmit one or more of additional SSB signaling during an additional portion of the SSB occasion associated with an additional beam, data during the portion of the SSB occasion associated with the beam, a tracking reference signal during the portion of the SSB occasion associated with the beam, a CSI-RS during the portion of the SSB occasion associated with the beam, or data including one or more reference signals during the portion of the SSB occasion associated with the beam.

The reception component 1102 may receive a request for a resource to replace the SSB signaling.

The transmission component 1104 may transmit an indication to initiate a handover or a beam reselection.

The transmission component 1104 may transmit an indication that the network node will transmit the SSB signaling during a portion of a subsequent SSB occasion associated with the beam.

The transmission component 1104 may transmit an indication that the network node will refrain from transmission of additional SSB signaling during one or more additional portions of the SSB occasion associated with one or more additional beams.

The transmission component 1104 may transmit, during the one or more additional portions of the SSB occasion, one or more of reference signals, or data signals.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: establishing a connection with a network node using a beam; and receiving, based at least in part on establishing the connection using the beam, an indication that the network node will refrain from transmission of synchronization signal block (SSB) signaling during a portion of an SSB occasion associated with the beam.

Aspect 2: The method of Aspect 1, further comprising: transmitting an indication that the UE supports skipping the SSB signaling during the portion of the SSB occasion associated with the beam.

Aspect 3: The method of Aspect 2, wherein transmission of the indication that the UE supports skipping the SSB signaling comprises one or more of: transmitting an indication of a capability to maintain a tracking loop on non-SSB channels; transmitting an indication of a capability to estimate signal strength on non-SSB channels; or transmitting an indication of a requested periodicity of non-SSB reference signals for maintaining the tracking loop.

Aspect 4: The method of any of Aspects 1-3, wherein the indication that the network node will refrain from transmission of SSB signaling during the portion of the SSB occasion associated with the beam comprises: an indication of a periodicity of SSB occasions configured to carry the SSB signaling during the portion associated with the beam.

Aspect 5: The method of any of Aspects 1-4, wherein the beam supports a single UE connection.

Aspect 6: The method of any of Aspects 1-5, further comprising maintaining a tracking loop based at least in part on one or more of: SSB signaling received in additional SSB occasions, or non-SSB reference signals.

Aspect 7: The method of any of Aspects 1-6, further comprising receiving one or more of: additional SSB signaling during an additional portion of the SSB occasion associated with an additional beam, data during the portion of the SSB occasion associated with the beam, a tracking reference signal during the portion of the SSB occasion associated with the beam, a channel state information reference signal (CSI-RS) during the portion of the SSB occasion associated with the beam, or data including one or more reference signals during the portion of the SSB occasion associated with the beam.

Aspect 8: The method of any of Aspects 1-7, further comprising: transmitting a request for a resource to replace the SSB signaling.

Aspect 9: The method of any of Aspects 1-8, further comprising: receiving an indication to initiate a handover or a beam reselection; and receiving an indication that the network node will transmit the SSB signaling during a portion of a subsequent SSB occasion associated with the beam.

Aspect 10: The method of any of Aspects 1-9, further comprising: receiving an indication that the network node will refrain from transmission of additional SSB signaling during one or more additional portions of the SSB occasion associated with one or more additional beams.

Aspect 11: The method of Aspect 10, wherein reception of the indication that the network node will refrain from transmission of the additional SSB signaling during the one or more additional portions of the SSB occasion associated with the one or more additional beams comprises one or more of: receiving an indication of inactive SSBs on a serving cell of the network node; or receiving an indication of inactive SSBs on a neighbor cell of the serving cell.

Aspect 12: The method of Aspect 11, wherein the indication of SSBs on the serving cell or the indication of SSBs on the neighbor cell includes a number of inactive SSBs, and wherein the number of inactive SSBs satisfies a threshold.

Aspect 13: The method of any of Aspects 10-12, further comprising receiving, during the one or more additional portions of the SSB occasion, one or more of: reference signals, or data signals.

Aspect 14: A method of wireless communication performed by a network node, comprising: establishing a connection with a user equipment (UE) using a beam; and transmitting, based at least in part on establishing the connection using the beam, an indication that the network node will refrain from transmission of synchronization signal block (SSB) signaling during a portion of an SSB occasion associated with the beam.

Aspect 15: The method of Aspect 14, further comprising: receiving an indication that the UE supports skipping the SSB signaling during the portion of the SSB occasion associated with the beam.

Aspect 16: The method of Aspect 15, wherein reception of the indication that the UE supports skipping the SSB signaling comprises one or more of: receiving an indication of a capability to maintain a tracking loop on non-SSB channels; receiving an indication of a capability to estimate signal strength on non-SSB channels; or receiving an indication of a requested periodicity of non-SSB reference signals for maintaining the tracking loop.

Aspect 17: The method of any of Aspects 14-16, wherein the indication that the network node will refrain from transmission of SSB signaling during the portion of the SSB occasion associated with the beam comprises: an indication of a periodicity of SSB occasions configured to carry the SSB signaling during the portion associated with the beam.

Aspect 18: The method of any of Aspects 14-17, wherein the beam supports a single UE connection.

Aspect 19: The method of any of Aspects 14-18, further comprising transmitting one or more of: additional SSB signaling during an additional portion of the SSB occasion associated with an additional beam, data during the portion of the SSB occasion associated with the beam, a tracking reference signal during the portion of the SSB occasion associated with the beam, a channel state information reference signal (CSI-RS) during the portion of the SSB occasion associated with the beam, or data including one or more reference signals during the portion of the SSB occasion associated with the beam.

Aspect 20: The method of any of Aspects 14-19, further comprising: receiving a request for a resource to replace the SSB signaling.

Aspect 21: The method of any of Aspects 14-20, further comprising: transmitting an indication to initiate a handover or a beam reselection; and transmitting an indication that the network node will transmit the SSB signaling during a portion of a subsequent SSB occasion associated with the beam.

Aspect 22: The method of any of Aspects 14-21, further comprising: transmitting an indication that the network node will refrain from transmission of additional SSB signaling during one or more additional portions of the SSB occasion associated with one or more additional beams.

Aspect 23: The method of Aspect 22, wherein transmission of the indication that the network node will refrain from transmission of the additional SSB signaling during the one or more additional portions of the SSB occasion associated with the one or more additional beams comprises one or more of: transmitting an indication of inactive SSBs on a serving cell of the network node; or transmitting an indication of inactive SSBs on a neighbor cell of the serving cell.

Aspect 24: The method of Aspect 23, wherein the indication of SSBs on the serving cell or the indication of SSBs on the neighbor cell includes a number of inactive SSBs, and wherein the number of inactive SSBs satisfies a threshold.

Aspect 25: The method of any of Aspects 22-24, further comprising transmitting, during the one or more additional portions of the SSB occasion, one or more of: reference signals, or data signals.

Aspect 26: An apparatus for wireless communication at a device, comprising a processor; memory coupled with the processor; and instructions stored in the memory and executable by the processor to cause the apparatus to perform the method of one or more of Aspects 1-25.

Aspect 27: A device for wireless communication, comprising a memory and one or more processors coupled to the memory, the one or more processors configured to perform the method of one or more of Aspects 1-25.

Aspect 28: An apparatus for wireless communication, comprising at least one means for performing the method of one or more of Aspects 1-25.

Aspect 29: A non-transitory computer-readable medium storing code for wireless communication, the code comprising instructions executable by a processor to perform the method of one or more of Aspects 1-25.

Aspect 30: A non-transitory computer-readable medium storing a set of instructions for wireless communication, the set of instructions comprising one or more instructions that, when executed by one or more processors of a device, cause the device to perform the method of one or more of Aspects 1-25.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors, coupled to the one or memories, configured to:
establish a connection with a network node using a beam associated with a sub-terahertz frequency; and
receive, based at least in part on establishing the connection using the beam, an indication that the network node will refrain from transmission of synchronization signal block (SSB) signaling during a portion of an SSB occasion associated with the beam.

2. The UE of claim 1, wherein the one or more processors are further configured to:
transmit an indication that the UE supports skipping the SSB signaling during the portion of the SSB occasion associated with the beam.

3. The UE of claim 2, wherein transmission of the indication that the UE supports skipping the SSB signaling comprises one or more of:
transmit an indication of a capability to maintain a tracking loop on non-SSB channels;
transmit an indication of a capability to estimate signal strength on non-SSB channels; or
transmit an indication of a requested periodicity of non-SSB reference signals for maintaining the tracking loop.

4. The UE of claim 1, wherein the indication that the network node will refrain from transmission of SSB signaling during the portion of the SSB occasion associated with the beam comprises:
an indication of a periodicity of SSB occasions configured to carry the SSB signaling during the portion associated with the beam.

5. The UE of claim 1, wherein the beam supports a single UE connection.

6. The UE of claim 1, wherein the one or more processors are further configured to maintain a tracking loop based at least in part on one or more of:
SSB signaling received in additional SSB occasions, or
non-SSB reference signals.

7. The UE of claim 1, wherein the one or more processors are further configured to receive one or more of:
additional SSB signaling during an additional portion of the SSB occasion associated with an additional beam,
data during the portion of the SSB occasion associated with the beam,
a tracking reference signal during the portion of the SSB occasion associated with the beam,
a channel state information reference signal (CSI-RS) during the portion of the SSB occasion associated with the beam, or
data including one or more reference signals during the portion of the SSB occasion associated with the beam.

8. The UE of claim 1, wherein the one or more processors are further configured to:
transmit a request for a resource to replace the SSB signaling.

9. The UE of claim 1, wherein the one or more processors are further configured to:
receive an indication to initiate a handover or a beam reselection; and
receive an indication that the network node will transmit the SSB signaling during a portion of a subsequent SSB occasion associated with the beam.

10. The UE of claim 1, wherein the one or more processors are further configured to:
receive an indication that the network node will refrain from transmission of additional SSB signaling during one or more additional portions of the SSB occasion associated with one or more additional beams.

11. The UE of claim 10, wherein reception of the indication that the network node will refrain from transmission of the additional SSB signaling during the one or more additional portions of the SSB occasion associated with the one or more additional beams comprises one or more of:
receive an indication of inactive SSBs on a serving cell of the network node; or
receive an indication of inactive SSBs on a neighbor cell of the serving cell.

12. The UE of claim 11, wherein the indication of SSBs on the serving cell or the indication of SSBs on the neighbor cell includes a number of inactive SSBs, and
wherein the number of inactive SSBs satisfies a threshold.

13. The UE of claim 10, wherein the one or more processors are further configured to receive, during the one or more additional portions of the SSB occasion, one or more of:
reference signals, or
data signals.

14. A network node for wireless communication, comprising:
one or more memories; and
one or more processors, coupled to the one or more memories, configured to:
establish a connection with a user equipment (UE) using a beam associated with a sub-terahertz frequency; and
transmit, based at least in part on establishing the connection using the beam, an indication that the network node will refrain from transmission of synchronization signal block (SSB) signaling during a portion of an SSB occasion associated with the beam.

15. The network node of claim 14, wherein the one or more processors are further configured to:
receive an indication that the UE supports skipping the SSB signaling during the portion of the SSB occasion associated with the beam.

16. The network node of claim 15, wherein reception of the indication that the UE supports skipping the SSB signaling comprises one or more of:
receive an indication of a capability to maintain a tracking loop on non-SSB channels;
receive an indication of a capability to estimate signal strength on non-SSB channels; or
receive an indication of a requested periodicity of non-SSB reference signals for maintaining the tracking loop.

17. The network node of claim 14, wherein the indication that the network node will refrain from transmission of SSB signaling during the portion of the SSB occasion associated with the beam comprises:
   an indication of a periodicity of SSB occasions configured to carry the SSB signaling during the portion associated with the beam.

18. The network node of claim 14, wherein the beam supports a single UE connection.

19. The network node of claim 14, wherein the one or more processors are further configured to transmit one or more of:
   additional SSB signaling during an additional portion of the SSB occasion associated with an additional beam,
   data during the portion of the SSB occasion associated with the beam,
   a tracking reference signal during the portion of the SSB occasion associated with the beam,
   a channel state information reference signal (CSI-RS) during the portion of the SSB occasion associated with the beam, or
   data including one or more reference signals during the portion of the SSB occasion associated with the beam.

20. The network node of claim 14, wherein the one or more processors are further configured to:
   receive a request for a resource to replace the SSB signaling.

21. The network node of claim 14, wherein the one or more processors are further configured to:
   transmit an indication to initiate a handover or a beam reselection; and
   transmit an indication that the network node will transmit the SSB signaling during a portion of a subsequent SSB occasion associated with the beam.

22. The network node of claim 14, wherein the one or more processors are further configured to:
   transmit an indication that the network node will refrain from transmission of additional SSB signaling during one or more additional portions of the SSB occasion associated with one or more additional beams.

23. The network node of claim 22, wherein transmission of the indication that the network node will refrain from transmission of the additional SSB signaling during the one or more additional portions of the SSB occasion associated with the one or more additional beams comprises one or more of:
   transmit an indication of inactive SSBs on a serving cell of the network node; or
   transmit an indication of inactive SSBs on a neighbor cell of the serving cell.

24. The network node of claim 23, wherein the indication of SSBs on the serving cell or the indication of SSBs on the neighbor cell includes a number of inactive SSBs, and wherein the number of inactive SSBs satisfies a threshold.

25. The network node of claim 22, wherein the one or more processors are further configured to transmit, during the one or more additional portions of the SSB occasion, one or more of:
   reference signals, or
   data signals.

26. A method of wireless communication performed by a user equipment (UE), comprising:
   establishing a connection with a network node using a beam associated with a sub-terahertz frequency; and
   receiving, based at least in part on establishing the connection using the beam, an indication that the network node will refrain from transmission of synchronization signal block (SSB) signaling during a portion of an SSB occasion associated with the beam.

27. The method of claim 26, further comprising maintaining a tracking loop based at least in part on one or more of:
   SSB signaling received in additional SSB occasions, or
   non-SSB reference signals.

28. The method of claim 26, further comprising receiving one or more of:
   additional SSB signaling during an additional portion of the SSB occasion associated with an additional beam,
   data during the portion of the SSB occasion associated with the beam,
   a tracking reference signal during the portion of the SSB occasion associated with the beam,
   a channel state information reference signal (CSI-RS) during the portion of the SSB occasion associated with the beam, or
   data including one or more reference signals during the portion of the SSB occasion associated with the beam.

29. A method of wireless communication performed by a network node, comprising:
   establishing a connection with a user equipment (UE) using a beam associated with a sub-terahertz frequency; and
   transmitting, based at least in part on establishing the connection using the beam, an indication that the network node will refrain from transmission of synchronization signal block (SSB) signaling during a portion of an SSB occasion associated with the beam.

30. The method of claim 29, further comprising transmitting one or more of:
   additional SSB signaling during an additional portion of the SSB occasion associated with an additional beam,
   data during the portion of the SSB occasion associated with the beam,
   a tracking reference signal during the portion of the SSB occasion associated with the beam,
   a channel state information reference signal (CSI-RS) during the portion of the SSB occasion associated with the beam, or
   data including one or more reference signals during the portion of the SSB occasion associated with the beam.

* * * * *